United States Patent
Kim

(10) Patent No.: US 10,843,823 B2
(45) Date of Patent: Nov. 24, 2020

(54) DRUG PACKAGING UNIT AND DRUG TRANSFER METHOD FOR SAME

(71) Applicant: CRETEM CO., LTD., Anyang-si (KR)

(72) Inventor: Ho Yeon Kim, Anyang-si (KR)

(73) Assignee: CRETEM (CO)., LTD., Anyang-Si (KR)

( * ) Notice: Subject to any disclaimer, the term of this patent is extended or adjusted under 35 U.S.C. 154(b) by 435 days.

(21) Appl. No.: 15/535,905

(22) PCT Filed: Dec. 14, 2015

(86) PCT No.: PCT/KR2015/013690
§ 371 (c)(1),
(2) Date: Jun. 14, 2017

(87) PCT Pub. No.: WO2016/099104
PCT Pub. Date: Jun. 23, 2016

(65) Prior Publication Data
US 2017/0334584 A1    Nov. 23, 2017

(30) Foreign Application Priority Data
Dec. 15, 2014  (KR) .................. 10-2014-0180761

(51) Int. Cl.
*B65B 1/14*    (2006.01)
*B65B 37/12*   (2006.01)
(Continued)

(52) U.S. Cl.
CPC ............... *B65B 1/14* (2013.01); *B65B 5/103* (2013.01); *B65B 35/06* (2013.01); *B65B 37/04* (2013.01);
(Continued)

(58) Field of Classification Search
CPC .......... B65B 1/14; B65B 5/103; B65B 37/04; B65B 37/12; B65B 57/10; B65B 57/14;
(Continued)

(56) References Cited

U.S. PATENT DOCUMENTS 3,064,406 A * 11/1962 Kennedy et al. ....... B65B 5/103
                                                    53/240
3,298,564 A *  1/1967 Wheatley et al. ...... B65B 35/06
                                                    221/10
(Continued)

FOREIGN PATENT DOCUMENTS

DE    2751697 A1 *  6/1978  ............. B65B 57/20
EP    0703148 A1 *  3/1996  ............. B65B 57/20
(Continued)

OTHER PUBLICATIONS

International Search Report for PCT/KR2015/013690 dated Apr. 29, 2016 from Korean Intellectual Property Office.

*Primary Examiner* — Stephen F. Gerrity
(74) *Attorney, Agent, or Firm* — Paratus Law Group, PLLC

(57) ABSTRACT

A drug packaging unit is disclosed. The drug packaging unit includes a storage portion separately discharging a plurality of units of a drug, a supply portion supplying the drug to a drug packaging member, a detection portion detecting a drug supply error by detecting the drug passing through the supply portion, an adjustment portion adjusting the number of units of drug discharged out of the supply portion, and a driver/controller individually driving the storage portion and the supply portion, thereby putting the drug on standby to be discharged. With this structure, it is possible to reduce a drug packaging time and it is easy to control drug supply.

6 Claims, 5 Drawing Sheets

(51) Int. Cl.
*B65B 57/16* (2006.01)
*B65B 5/10* (2006.01)
*B65B 35/06* (2006.01)
*B65G 27/16* (2006.01)
*B65B 37/04* (2006.01)
*B65B 57/20* (2006.01)
*B65B 57/14* (2006.01)
*B65G 47/14* (2006.01)

(52) U.S. Cl.
CPC .............. *B65B 37/12* (2013.01); *B65B 57/14* (2013.01); *B65B 57/16* (2013.01); *B65B 57/20* (2013.01); *B65G 27/16* (2013.01); *B65G 47/1457* (2013.01)

(58) Field of Classification Search
CPC ......... B65B 57/16; B65B 57/20; B65B 35/06; B65G 27/16; B65G 47/1457
USPC .......................................... 53/54, 494, 500
See application file for complete search history.

(56) References Cited

U.S. PATENT DOCUMENTS

| | | | | |
|---|---|---|---|---|
| 3,746,211 A | * | 7/1973 | Burgess, Jr. | ............ G06M 3/02 221/7 |
| 5,369,940 A | | 12/1994 | Soloman | |
| 5,473,703 A | * | 12/1995 | Smith | .................... G06M 1/101 221/200 |
| 8,827,112 B2 | * | 9/2014 | Yuyama et al. | ........ B65B 5/103 221/237 |
| 9,038,816 B2 | * | 5/2015 | Koike et al. | ............... B65B 1/14 198/803.16 |
| 9,233,789 B2 | * | 1/2016 | Koike et al. | ............. B65B 5/103 |
| 2011/0313566 A1 | * | 12/2011 | Kim | ........................ B65B 5/103 700/231 |
| 2012/0072017 A1 | * | 3/2012 | Kim | ........................ B65B 57/20 700/231 |
| 2013/0284755 A1 | * | 10/2013 | Yuyama et al. | ........ B65B 5/103 221/13 |
| 2014/0246451 A1 | * | 9/2014 | Yuyama et al. | ........ B65B 35/06 221/7 |
| 2014/0353327 A1 | | 12/2014 | Bae et al. | |
| 2015/0129603 A1 | | 5/2015 | Koike et al. | |

FOREIGN PATENT DOCUMENTS

| | | | | |
|---|---|---|---|---|
| EP | 2664551 A1 | * | 11/2013 | .............. B65B 5/103 |
| EP | 2740671 A1 | * | 6/2014 | .............. B65B 5/103 |
| FR | 1114037 A | * | 4/1956 | .............. B65B 57/14 |
| JP | 2011-219157 A | | 11/2011 | |
| KR | 20120082547 A | * | 7/2012 | .............. B65B 57/20 |
| KR | 101333495 B1 | * | 11/2013 | ................ B65B 1/30 |
| KR | 10-2014-0115152 A | | 9/2014 | |
| KR | 10-2014-0138187 A | | 12/2014 | |
| KR | 10-2014-0141277 A | | 12/2014 | |

\* cited by examiner

DRUG PACKAGING UNIT AND DRUG TRANSFER METHOD FOR SAME

CROSS REFERENCE TO PRIOR APPLICATIONS

This application is a National Stage Patent Application of PCT International Patent Application No. PCT/KR2015/013690 (filed on Dec. 14, 2015) under 35 U.S.C. § 371, which claims priority to Korean Patent Application No. 10-2014-0180761 (filed on Dec. 15, 2014), which are all hereby incorporated by reference in their entirety.

TECHNICAL FIELD

The present invention relates to a drug packaging unit and, more particularly, to a drug packaging unit capable of packaging drug in single doses according to a prescription, and a drug transfer method for same.

BACKGROUND ART

Drug packaging apparatuses that automatically dispense a plurality of units of a drug (the units hereinafter meaning tablets, capsules, pills, lozenges, and any other discrete forms of a drug that can be individually handled, and the units of a drug hereinafter being referred to as simply drug units) as prescribed for a variety of illnesses, and package the drug units in single doses have recently become widely available. The drug packaging apparatuses dispense drug, unit by unit, from a drug storage tank and packages the drug in single doses.

Such a drug packaging unit is typically driven by a single driver when dispensing and packing drug. Therefore, there are problems that a packaging time is long due to delay in the transfer process of driving force and the size of the drug packaging unit is large due to a large size of the driver. Furthermore, when it is necessary to stop a portion of the drug packaging unit due to a drug supply error, it takes a long time for the whole drug packaging unit to stop, which deteriorates drug packaging reliability.

DISCLOSURE

Technical Problem

Accordingly, the present invention has been made in view of the problems described above, and an object of the present invention is to provide a drug packaging unit in which each operation block can be individually driven, the drug packaging unit offering easy drug supply control and improving drug supply reliability. Another object of the invention is to provide a drug transfer method performed by the drug packaging unit.

Technical Solution

In order to accomplish the object of the invention, according to one aspect, there is provided a drug packaging unit including: a storage portion from which a plurality of units of drug stored in the storage portion is separately discharged; a supply portion configured to supply the units of a drug discharged from the storage portion, to a drug packaging member; a detection portion configured to detect the units of a drug passing through the supply portion, thereby detecting a drug supply error; an adjustment portion adjusting the number of the units of a drug discharged out of the supply portion; and a driver/controller configured to individually drive the storage portion and the supply portion to put the drug on standby to be discharged out of the supply portion.

According to the aspect, the detection portion may include: at least one drug detection sensor installed in the supply portion; a shutter configured to close an outlet of the supply portion; and a shutter driver configured to occasionally drive the shutter in accordance with detection information detected by the drug sensor.

According to the aspect, the supply portion may include an inclined pipe sloping down toward the drug packaging member. The drug detection sensor may include an inlet sensor installed near an inlet of the supply portion to detect the drug introduced into the supply portion, an outlet sensor installed near the outlet of the supply portion to detect the drug discharged out of the supply portion, and a middle sensor installed between the inlet and the outlet to detect the drug passing through the supply portion.

According to the aspect, the adjustment portion may include a counting sensor detecting the number of units of the drug passing through the supply portion, a guide member guiding the units of the drug to a packaging path or a recovery path, and a guide member driver driving the guide member in accordance with count information detected by the counting sensor.

According to the aspect, the driver/controller may include a first driver moving up and down the storage portion to a position where the storage portion communicates with the supply portion, a second driver rotating the storage portion to generate centrifugal force, thereby discharging the drug out of the storage portion, a third driver conveying the drug within the supply portion, and a controller putting the drug on standby to be discharged by driving any one driver of the first to third drivers.

According to the aspect, the controller may control a discharge speed of the drug by increasing or decreasing a rotation speed of the second driver.

According to the aspect, the controller may individually drive the first driver, the second driver, and the third driver to put the drug on standby to be discharged when the drug packaging unit stops operating.

In order to accomplish the object of the invention, according to another aspect, there is provided a drug transfer method including: determining whether a drug is detected by any one sensor of the inlet sensor, the outlet sensor, and the middle sensor when the drug packaging unit stops operating; driving the third driver to put the drug near the outlet of the supply portion when no drug is detected by the outlet sensor; driving the third driver to put the drug on a supply path in the supply portion when no drug is detected by the middle sensor; and driving the first driver and the second driver to put the drug near the inlet of the supply portion when no drug is detected by the inlet sensor.

Advantageous Effects

According to the present invention having the above-described structure, first, since the drug is always put on standby to be discharged, it is possible to reduce a drug supply time, thereby reducing a drug packaging time and promptly responding to drug supply failure.

Second, since the rotation speed of the storage portion can be controlled, it is easy to control drug discharge.

Third, since a drug supply error can be detected during supply of a drug, a drug supply can be suspended, or a discharged drug can be recovered before being supplied to a drug packaging member. Therefore, drug packaging reliability is improved.

BEST MODE

Mode for Invention

Hereinafter, a preferred embodiment of the invention will be described with reference to the accompanying drawings.

Figure 1:
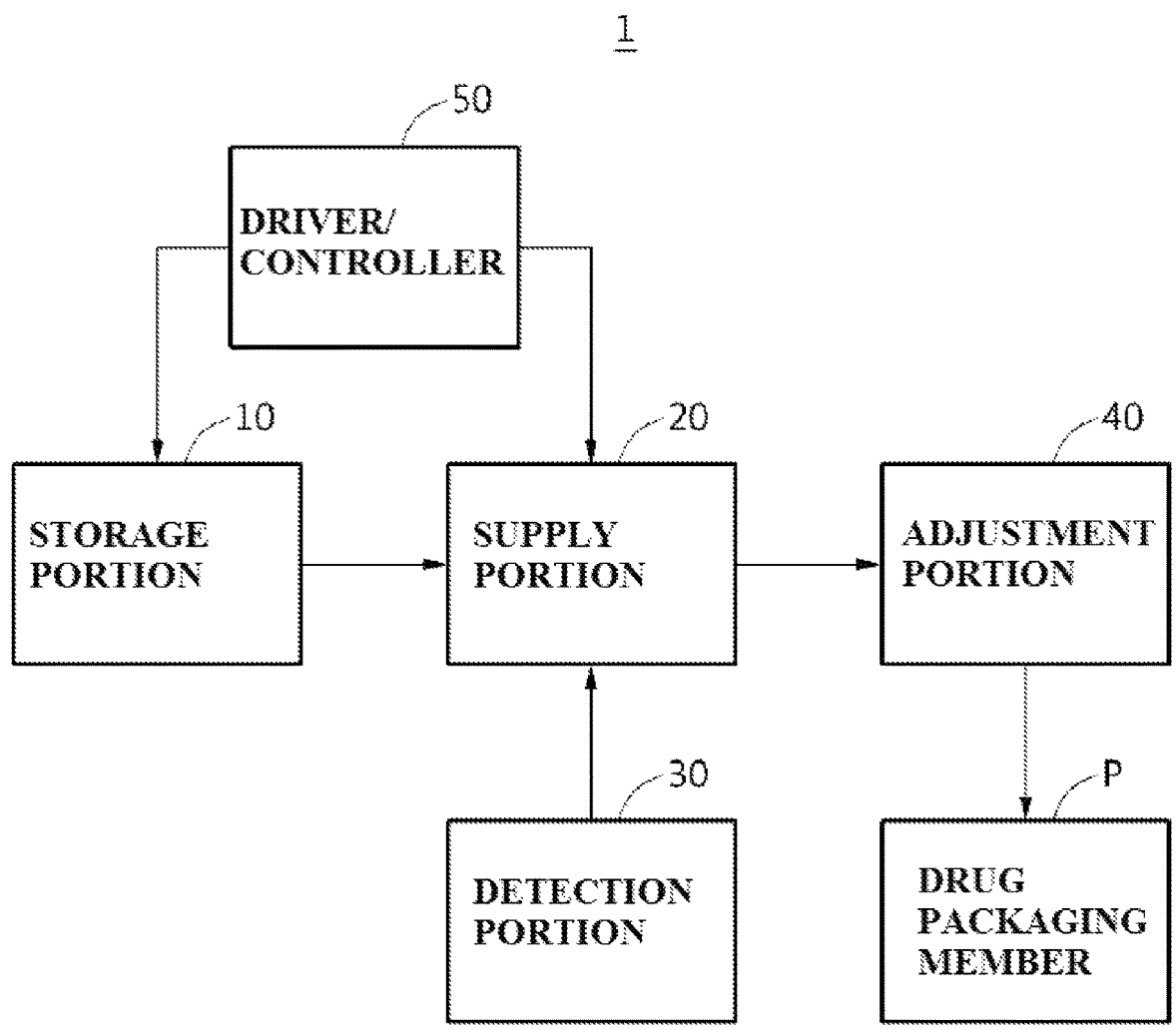
FIG. 1 is a block diagram illustrating a drug packaging unit according to one embodiment of the present invention.

As illustrated in FIG. 1, according to one embodiment of the present invention, a drug packaging unit 1 includes a storage portion 10, a supply portion 20, a detection portion 30, an adjustment portion 40, and a driver/controller 50.

Figure 2:
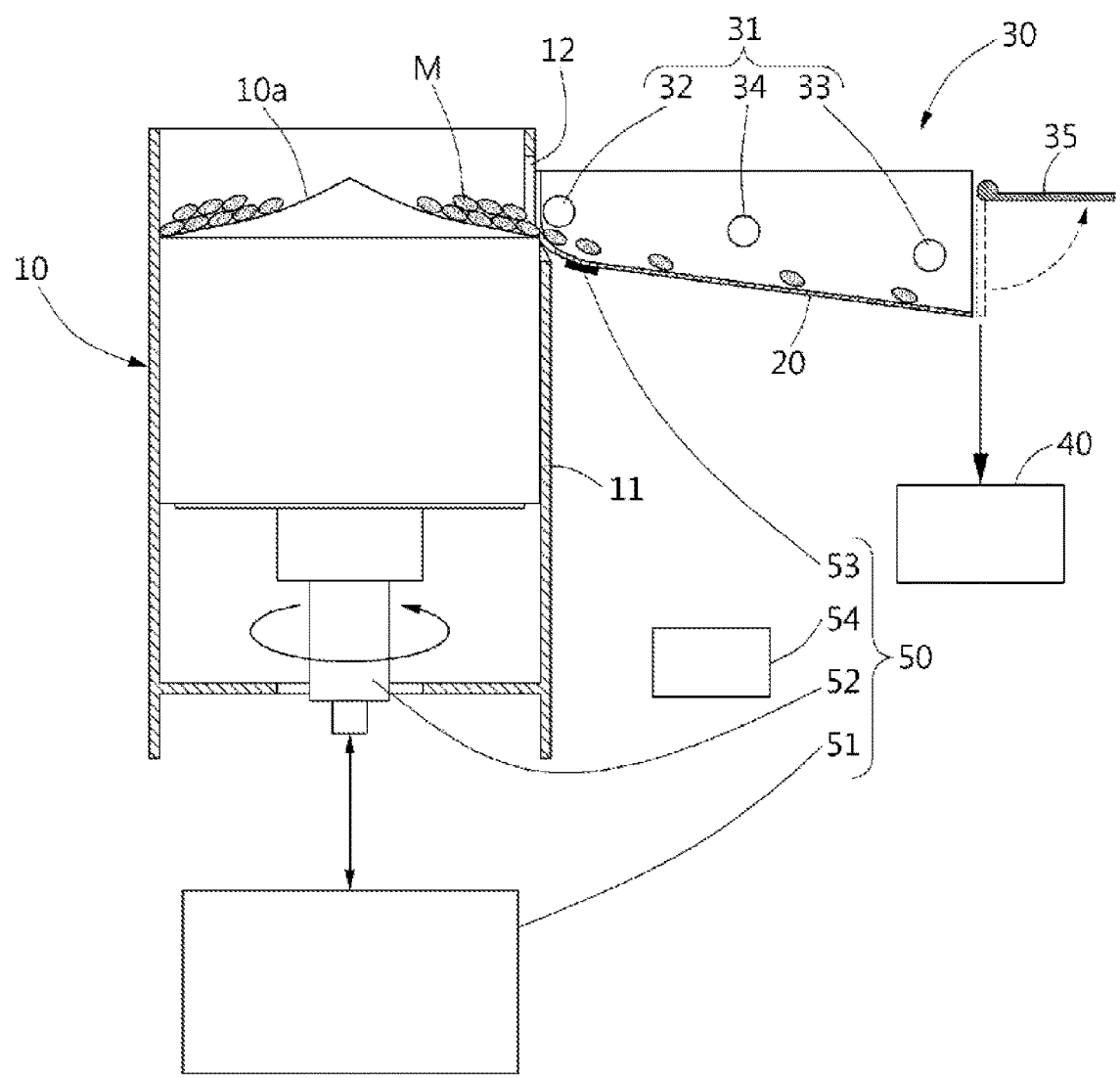
FIG. 2 is a schematic view illustrating a storage portion shown in FIG. 1.

The storage portion 10 discharges a plurality of units of drug M, unit by unit. As illustrated in FIG. 2, the storage portion 10 has an inclined surface 10a. The storage portion 10 is moved up and down and rotated by the driver/controller 50 described below. The operation of the storage portion 10 is described in detail below.

Figure 3:
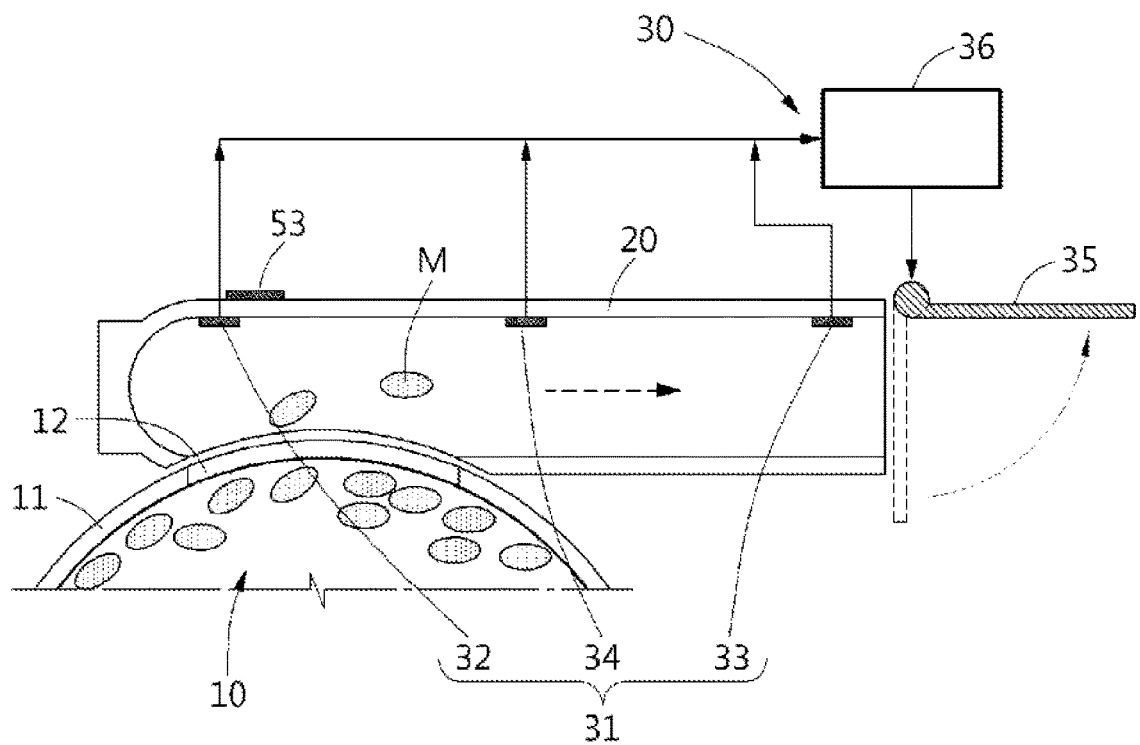
FIG. 3 is a schematic view illustrating the storage portion and a detection portion shown in FIG. 1.
Figure 4:
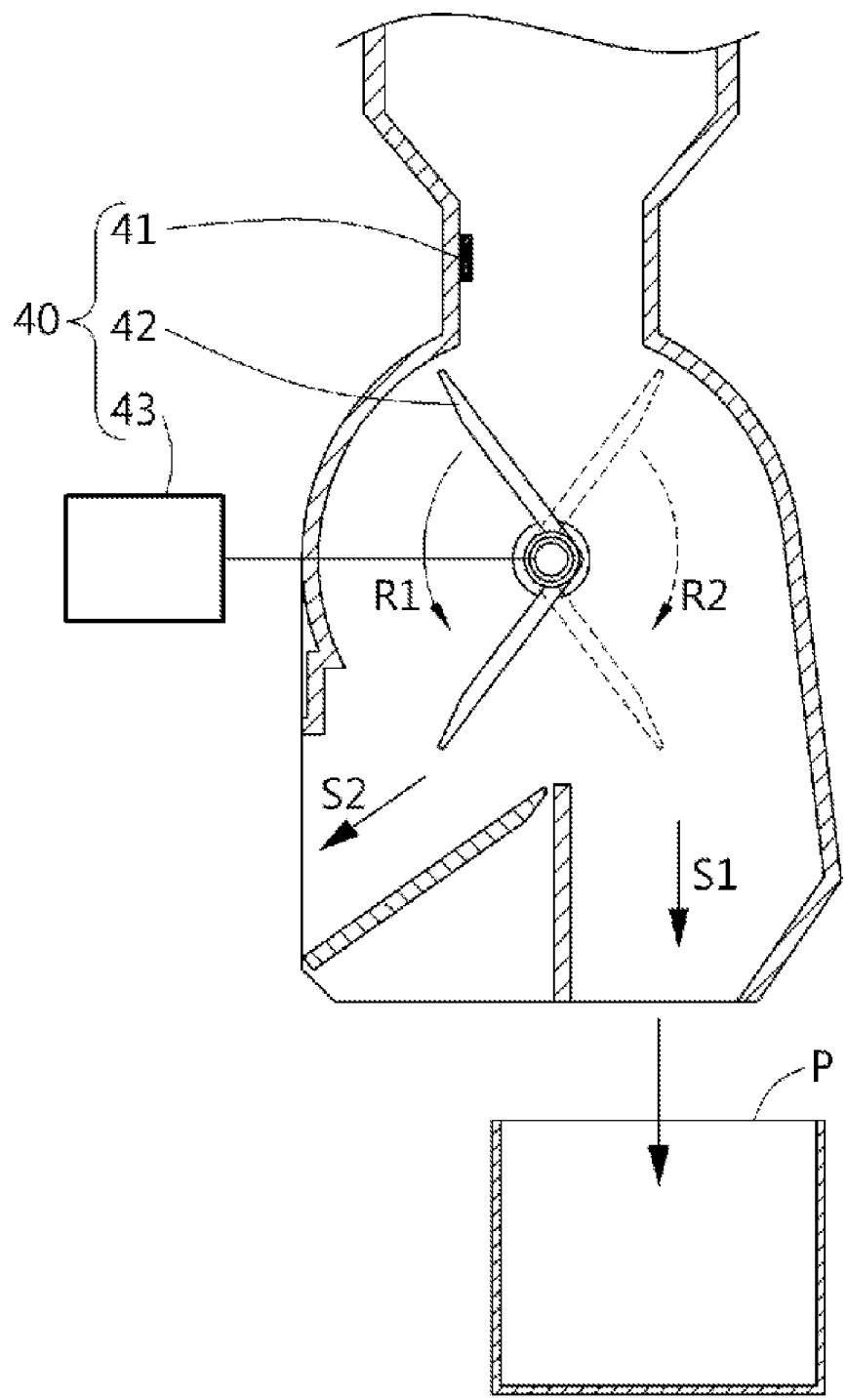
FIG. 4 is a schematic view illustrating an adjustment portion shown in FIG. 1.

The supply portion 20 supplies the units of drug M discharged from the storage portion 10 to a drug packaging member P. The supply portion 20 has an inclined pipe shape, and it slopes down toward the drug packaging member and linearly extends as illustrated in FIG. 3.

The detection portion 30 detects a unit of drug M passing through the supply portion 20, thereby detecting a drug supply error. To this end, as illustrated in FIG. 3, the detection portion includes a drug detection sensor 31, a shutter 35, and a shutter driver 36.

The drug detection sensor 31 includes an inlet sensor 32, an outlet sensor 33, and a middle sensor 34. The inlet sensor 32 is installed near an inlet of the supply portion 20 and detects a unit of drug M introduced into the supply portion 20. The outlet sensor 33 is installed near an outlet of the supply portion 20 and detects a unit of drug M discharged out of the supply portion 20. The middle sensor 34 is installed between the inlet and the outlet of the supply portion 20 and detects a unit of drug M passing through the supply portion 20. According to the present embodiment, each of the inlet sensor 32, the outlet sensor 33, and the middle sensor 34 consists of one sensor but may consist of a plurality of sensors.

The shutter 35 is installed near the outlet of the supply portion 20 and closes the outlet of the supply portion 20. The shutter driver 36 drives the shutter 35 as necessary in accordance with detection information detected by the drug detection sensor 31, i.e. any one of the inlet sensor 32, the outlet sensor 33, and the middle sensor 34. Specifically, the shutter driver 36 drives the shutter 35 to open only when it is necessary to discharge the drug M out of the supply portion so that a predetermined amount of drug M or a predetermined number of units of drug M can be discharged.

For example, the shutter 35 closes the outlet of the supply portion 20 when one unit of drug M is discharged out of the supply portion 20. In addition, when any one sensor of the drug detection sensor 31 detects a drug supply error, the shutter 35 may be operated to close the outlet of the supply portion 20, so that the drug M cannot be discharged out of the supply portion but is put on standby to be discharged out of the supply portion.

The adjustment portion 40 determines whether the number of units of drug M discharged out of the supply portion 20 is adequate. Only when then the number of units of drug M is adequate, the drug M is guided to the drug packaging member P. The adjustment portion 40 includes a counting sensor 41, a guide member 42, and a guide member driver 43. The counting sensor 41 detects the number of units of drug that have passed through the supply portion 20, and the guide member 42 guides the units of drug M to a packaging path S1 extending to the drug packaging member P or to a recovery path S2 through which the units of drug M are recovered. In the present embodiment, the guide member 42 is a rotatable wing. The guide member 42 rotates in a first direction R1 or a second direction R2, thereby opening either the packaging path S1 or the recovery path S2.

The guide member driver 43 drives the guide member 42 in accordance with count information detected by the counting sensor 41. For example, the guide member driver 43 drives the guide member 42 to rotate in the second direction R2 so that the recovery path S2 can be opened and the drug M can be recovered when it is determined that the number of units of drug M counted by the counting sensor 41 is greater than a predetermined value.

The driver/controller 50 individually drives the storage portion 10 and the supply portion 20, thereby putting the drug M on standby to be discharged outside. The driver/controller 50 includes a first driver 51, a second driver 52, a third driver 53, and a controller 54.

As illustrated in FIG. 2, the first driver 51 moves the storage portion 10 up and down to a position where the storage portion 10 can communicate with the supply portion 20. In addition, the second driver 52 rotates the storage portion 10 to generate centrifugal force, thereby discharging the drug M out of the storage portion 10. That is, the first driver 51 and the second driver 52 generate vertical force and rotary force to discharge the drug placed on the inclined surface 10a of the storage portion 10 to the supply portion 20.

For reference, as illustrated in FIGS. 2 and 3, the storage portion 10 is moved up and down by the first driver 51 while being in contact with the inside surface of a drug housing 11, and communicates with the supply portion 20 through a communication hole 12 formed in the wall of the drug housing 11. That is, when the storage portion 10 is rotated by the second driver 52, the drug M moves toward the wall of the drug housing due to the centrifugal force and enters into the supply portion 20 through the communication hole 12.

The third driver 53 functions to convey the drug M within the supply portion 20. The third driver 53 causes a plurality of units of drug M discharged from the storage portion 10 to sequentially move to the adjustment portion 40. To this end, the third driver 53 may include a vibrator that vibrates the inclined supply portion 20.

The controller 54 drives any one driver of the first to third drivers 51, 52, and 53, thereby putting the drug M on standby to be discharged, in accordance with the information detected by the detection portion 30. The operation of the controller 54 will be described in more detail when describing a drug packaging method below.

A drug packaging method performed by the drug packaging unit 1 according to the present invention will be described with reference to FIGS. 1 to 4.

As illustrated in FIGS. 1 and 2, a plurality of units of drug M stored in the storage portion 10 is moved up or down and rotated to be separated from each other by the driving force of the first driver 51, and is discharged to the supply portion 20. The units of drug M discharged to the supply portion 20 are supplied to the drug packaging members P. In this process, as illustrated in FIG. 3, the detection portion 30 detects the units of drug M passing through the supply portion 20, thereby detecting a drug supply error.

The number of units of drug M discharged out of the supply portion 20 is counted by the counting sensor 41 in the adjustment portion 40. When the number is within a normal range, the guide member is rotated in the first direction R1 and thus the units of drug M are guided to the drug packaging member P along the packaging path S1. Meanwhile, when the number of units of drug M detected by the counting sensor 41 is in an abnormal range, the guide member 42 is rotated in the second direction R2 and thus the units of drug M are recovered through the recovery path S2. In this case, the guide member 42 is driven by the guide member driver 42 in accordance with the information detected by the counting sensor 41.

Meanwhile, if the operation of the drug packaging unit 1 is stopped for a certain reason, for example, when a recovery tank becomes full with the units of drug M and thus needs to be replaced, when the storage portion 10 needs to be replenished with the drug M, or when the adjustment portion 40 is out of order or needs to be replaced due to failure, the driver/controller 50 suspends supply of the drug M which is put on standby to be discharged. The standby state of the drug M in the drug packaging unit 1 will be described below with reference to FIG. 5.

Figure 5:
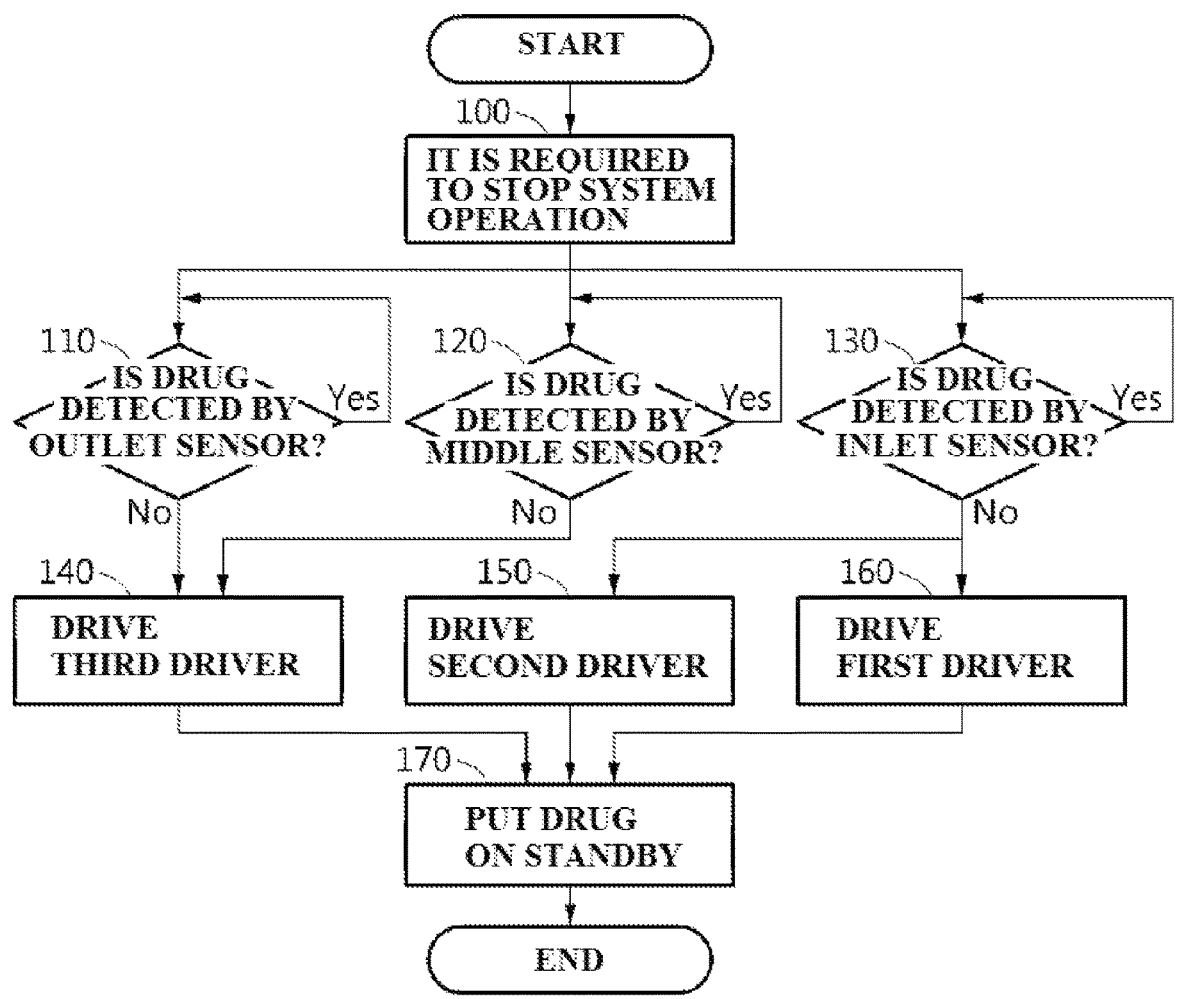
FIG. 5 is a flowchart showing an operation sequence of putting a drug on standby to be discharged when the drug packaging unit stops operating.

With reference to FIG. 5, when the drug packaging unit 1 stops operating at Step 100, the outlet sensor 33 determines whether the drug M is present near the exit of the supply portion 20 at Step 110. When no drug M is detected around the outlet of the supply portion 20, the third driver 53 is driven such that the drug M can be placed near the outlet of the supply portion 20 at Step 140. In addition, when the drug packaging unit 1 stops operating at Step 100, the middle sensor 34 determines whether the drug M is present on a supply path within the supply portion 20 at Step 120. When, no drug is detected on the supply portion 20, the third driver 53 is driven such that the drug M can be placed in the middle of the supply portion 20 at Step 140.

In addition, when the drug packaging unit 1 stops operating at Step 100, and when the inlet sensor 32 detects no drug M around the inlet of the supply portion 20 at Step 130, the first and second drivers 51 and 52 are driven at Steps 150 and 160 so that the drug M can be discharged out of the storage portion 10 and introduced into the supply portion 20. In this way, the drug M always remains on standby in the supply portion 20 at Step 170 even when the packaging unit 1 stops operating.

In this case, although not illustrated in the drawings, the drug packaging unit may further include a drug detection sensor that detects the drug M placed on the inclined surface 10a of the storage portion 10. When the drug detection sensor (not shown) detects the drug M on the inclined surface 10a but the inlet sensor 32 detects no drug M around the inlet of the supply portion 20, the operation speed of the second driver 52 is increased and thus the rotation speed of the storage portion 10 is increased. That is, the centrifugal force of the storage portion 10 is increased. Thus, the drug M can be easily supplied to the supply portion 20 from the storage portion 10. When the drug M starts to be supplied to the supply portion 20, the operation speed of the second driver 52 is reduced to reduce the rotation speed of the storage portion 10.

In addition, there may be a modification in which a signal indicating that it is required to stop the operation of the drug packaging unit 1 and then to replenish drug M is generated when there is no drug M remaining on the inclined surface 10a.

As described above, when the operation of the drug packaging unit 1 is stopped, the first, second, and third drivers 51, 52, and 53 are independently driven to put the drug M on standby to be supplied to the drug packaging member. Therefore, it is possible to reduce a drug packaging time when the operation of the drug packaging unit 1 is resumed. In addition, since it is possible to control the rotation speed of the storage portion 10 in the drug packaging unit 1, the rotation speed of the storage portion 10 is increased when the drug M is not discharged out of the storage portion and decreased after the drug M starts to be discharged. In this way, it is possible to facilitate supply of the drug M from the storage portion to the supply portion.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The present invention can apply to a drug packaging device.

The invention claimed is:
1. A drug packaging unit comprising:
a storage portion configured to store drugs therein, wherein the storage portion is movable up and down by a first driver connected thereto and rotatable by a second driver connected thereto such that the drugs stored in the storage portion are discharged through an outlet thereof by centrifugal force;
a supply channel fixed to the storage portion and configured to supply the drugs discharged from the storage portion to a drug packaging member, the supply channel including an inlet portion connected to the outlet of the storage portion, an outlet portion opposite to the inlet portion, and a middle portion provided between the inlet portion and the outlet portion;
a detection portion configured to detect the drugs passing through the supply channel, thereby detecting a drug supply error; and
a third driver including a vibrator attached to the supply channel at the inlet portion and configured to vibrate the supply channel,
wherein the detection portion comprises at least one drug detection sensor installed in the supply channel, and the at least one drug detection sensor includes an inlet sensor installed at the inlet portion of the supply channel to detect the drugs introduced into the supply channel through the inlet portion, an outlet sensor installed at the outlet portion of the supply channel to detect the drugs discharged out of the supply channel, and a middle sensor installed at the middle portion between the inlet portion and the outlet portion to detect the drugs passing through the supply channel, wherein, if the drug packaging unit is stopped in a middle of an operation of the drug packaging unit, after the drug packaging unit is stopped, the outlet sensor or the middle sensor is configured to restart to detect the drugs on the supply channel and the vibrator is configured to vibrate the supply channel if no drug is detected by the outlet sensor or by the middle sensor at the middle portion of the supply channel until the drugs move to the outlet portion and the middle portion of the supply channel such that the drugs remain at the outlet portion and the middle portion of the supply channel.

2. The drug packaging unit according to claim 1, wherein the detection portion comprises:

a shutter installed at the outlet portion of the supply portion channel; and a shutter driver configured to operate the shutter to open and close the outlet portion in accordance with detection information detected by the drug sensor.

3. The drug packaging unit according to claim 2, wherein: the supply channel is sloping down toward the drug packaging member.

4. The drug packaging unit according to claim 1, wherein the second driver controls a discharge speed of the drugs by varying a rotation speed of the storage portion.

5. The drug packaging unit of claim 1, wherein, if the drug packaging unit is stopped in the middle of the operation of the drug packaging unit, after the drug packaging unit is stopped, the inlet sensor is configured to restart to detect the drugs at the inlet portion of the supply channel and the first and second drivers are configured to be operated if no drug is detected by the inlet sensor until the drugs move to the inlet portion of the supply channel such that the drugs are placed at the inlet portion of the supply channel.

6. The drug packaging unit of claim 5, wherein when it is determined that no drug is detected by the inlet sensor at the inlet portion after a predetermined period of time passes even though the drugs are present in the storage portion, the second driver is configured to be operated to increase a rotation speed of the storage portion.

* * * * *